(12) United States Patent
Bergeron

(10) Patent No.: US 6,734,216 B2
(45) Date of Patent: May 11, 2004

(54) PLASTIC RECYCLING

(76) Inventor: Claude Bergeron, 25 rue de Callieres, #4, Cap-de-la-Madeleine, QC (CA), G8W 1B5

( * ) Notice: Subject to any disclaimer, the term of this patent is extended or adjusted under 35 U.S.C. 154(b) by 183 days.

(21) Appl. No.: 09/916,835

(22) Filed: Jul. 27, 2001

(65) Prior Publication Data

US 2002/0099105 A1 Jul. 25, 2002

(30) Foreign Application Priority Data

Jan. 24, 2001 (CA) .............................................. 2332189
Jan. 30, 2001 (CA) .............................................. 2333248

(51) Int. Cl.⁷ ................................................ C08J 11/04
(52) U.S. Cl. .......................................... 521/48; 521/40
(58) Field of Search .......................... 521/40, 40.5, 48, 521/48.5

(56) References Cited

FOREIGN PATENT DOCUMENTS

| DE | 195 09 244 C1 | * | 11/1996 |
| DE | 198 11 199 A1 | * | 9/1999 |
| WO | WO 93/02141 A1 | * | 2/1993 |
| WO | WO 02/14413 A1 | * | 2/2002 |

* cited by examiner

*Primary Examiner*—Katarzyna Wyrozebski
(74) *Attorney, Agent, or Firm*—Eric Fincham

(57) ABSTRACT

There is provided a method for recovering energy from glass windshields removed from vehicles which comprises the step of separating a polyvinyl butyral polymer from the glass in a windshield and using the recovered polyvinyl butyral polymer as a fuel to replace a fossil fuel in an energy creating plant or alternatively to use the polyvinyl butyral polymer as an adhesive.

5 Claims, No Drawings

PLASTIC RECYCLING

The present invention relates to recycling and more particularly, relates to a recycling of plastic materials.

Recycling of glass material is well known in the art and is widely practiced in the industry. Large supplies of glass material come from containers used for liquids—i.e. soft drinks and the like and as well, from the windshields of scrapped vehicles.

In recovering the glass from windshields of scrapped vehicles, the windshield yields a plastic material which normally forms an intermediate layer of the windshield. This material is a polyvinyl butyral polymer. The polyvinyl butyral polymer may be in combination with other compounds such as tetraethylene-glycol. The plastic materials removed from the windshields have, to date, been stocked piled as they have not been used for any other purposes.

It is therefore an object of the present invention to provide a process to recycle the plastic material from windshields.

According to one aspect of the present invention, there is provided a method for recovering energy from windshields, the method comprising the steps of separating a polyvinyl butyral polymer from glass in the windshield, and using the polyvinyl butyral polymer as a fuel and an energy creating plant.

In a further aspect of the present invention, there is provided a method for recycling a polyvinyl butyral polymer from glass in a windshield, a method comprising the step of recovering the polyvinyl butyral polymer from a windshield glass by dissolving the polyvinyl butyral polymer in a solvent comprising a combination of acetone and isopropanol, and thickening the material to a desired consistency for subsequent use as an adhesive.

In a greater detail, the present invention utilizes the polyvinyl butyral polymer material from a windshield by extracting the same from a mixture of the glass and polymer. The method comprises utilizing a solvent and which solvent may be acidic acid or acetone or other suitable material. In a preferred embodiment, a combination of acetone and isopropanol is utilized.

Following the extraction of the polyvinyl butyral polymer, the solution may be thickened to the desired consistency and used as an adhesive in wood products. In particular, the recycled polymer may be used as an adhesive agent in composite wood products such as plywood, presswood, and the like.

Alternatively, the material may be used as a fuel in an energy creating plant to replace fossil fuels. The polymer presents the advantage in that it is readily utilizable as a fuel and is relatively non polluting. As such, it could replace carbon based fuels such as coal which do have substantial environmental pollution problems.

It will be understood that the above described embodiments are for purposes of illustration only and that changes or modifications may be made thereto without departing from the spirit and scope of the invention.

I claim:

1. A method for recovering energy from glass windshields removed from vehicles, the method comprising the step of separating a polyvinyl butyral polymer from glass in the windshield, and using the recovered polyvinyl butyral polymer as a fuel to replace a fossil fuel in a energy creating plant.

2. The method of claim 1 wherein said step of separating polyvinyl butyral polymer from glass in the windshield comprises dissolving said polyvinyl butyral polymer.

3. The method of claim 2 wherein said polyvinyl butyral polymer is dissolved in a solution of acetone and isopropanol.

4. A method for recycling a polyvinyl butyral polymer from glass in a windshield, the method comprising the step of recovering the polyvinyl butyral polymer from glass by dissolving the polyvinyl butyral polymer in a solvent which comprises a mixture of acetone and isopropanol, and subsequently thickening said dissolved polyvinyl butyral polymer for use as an adhesive.

5. The method of claim 4 further including the step of using said dissolved polyvinyl butyral polymer as an adhesive in a composite wood product.

* * * * *